Feb. 23, 1926.　　　　　　　　　　　　　1,574,212
L. H. THOEN
LEVELING MECHANISM FOR COMBINED HARVESTERS
Filed May 1, 1924　　　　2 Sheets-Sheet 1

INVENTOR.
LOWELL H. THOEN.
BY
Dewey, Strong, Townsend & Loftus
ATTORNEYS.

Feb. 23, 1926.  
L. H. THOEN  
1,574,212  
LEVELING MECHANISM FOR COMBINED HARVESTERS  
Filed May 1, 1924  2 Sheets-Sheet 2
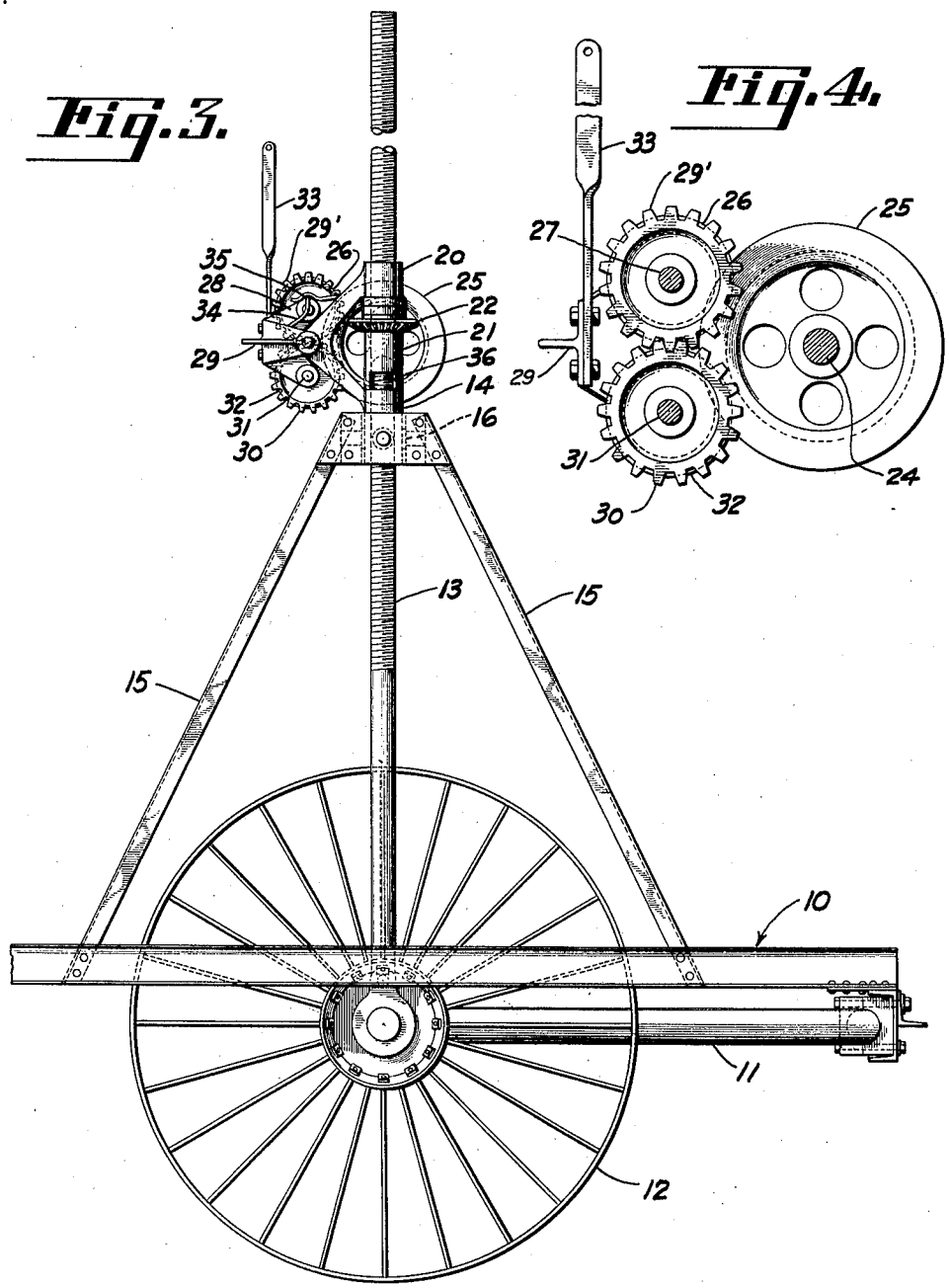
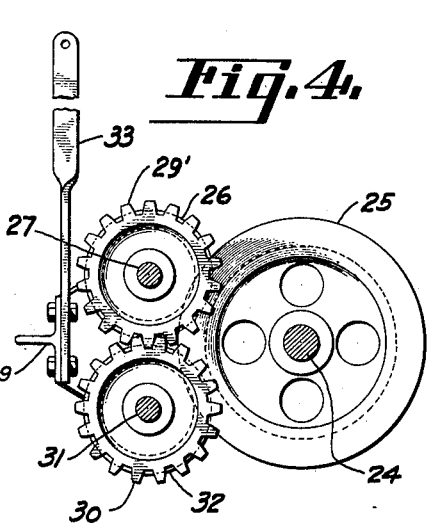
INVENTOR.  
LOWELL H. THOEN.  
BY  
*Dewey, Strong, Townsend & Loftus*  
ATTORNEYS.

Patented Feb. 23, 1926.

1,574,212

UNITED STATES PATENT OFFICE.

LOWELL H. THOEN, OF STOCKTON, CALIFORNIA, ASSIGNOR, BY MESNE ASSIGNMENTS, TO CATERPILLAR TRACTOR CO., A CORPORATION OF CALIFORNIA.

LEVELING MECHANISM FOR COMBINED HARVESTERS.

Application filed May 1, 1924. Serial No. 710,425.

*To all whom it may concern:*

Be it known that I, LOWELL H. THOEN, a citizen of the United States, residing at Stockton, county of San Joaquin, and State of California, have invented new and useful Improvements in Leveling Mechanism for Combined Harvesters, of which the following is a specification.

This invention relates to combined harvesters, and more particularly to mechanism for leveling the harvester frame for operating upon the side of a hill.

The objects of the invention are to eliminate binding strains upon the gears, screws and the like, and to insure proper alignment of the various parts at all times. A further object is to simplify the control of the leveling mechanism and also to protect the mechanism against the entrance of dust, dirt, chaff and the like.

One form which my invention may assume is exemplified in the following description and illustrated in the accompanying drawings, in which—

Fig. 3 shows a side elevation.

Fig. 4 shows a detail of the reversing mechanism for the leveling device.

Figure 1:
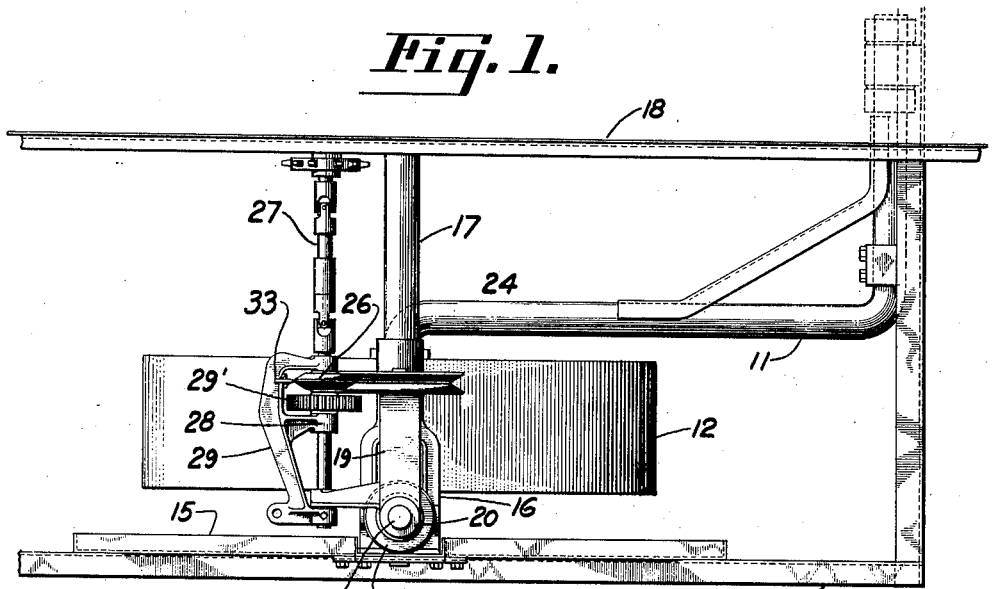
Fig. 1 shows a plan view of a portion of a harvester fitted with my improved leveling mechanism.
Figure 2:
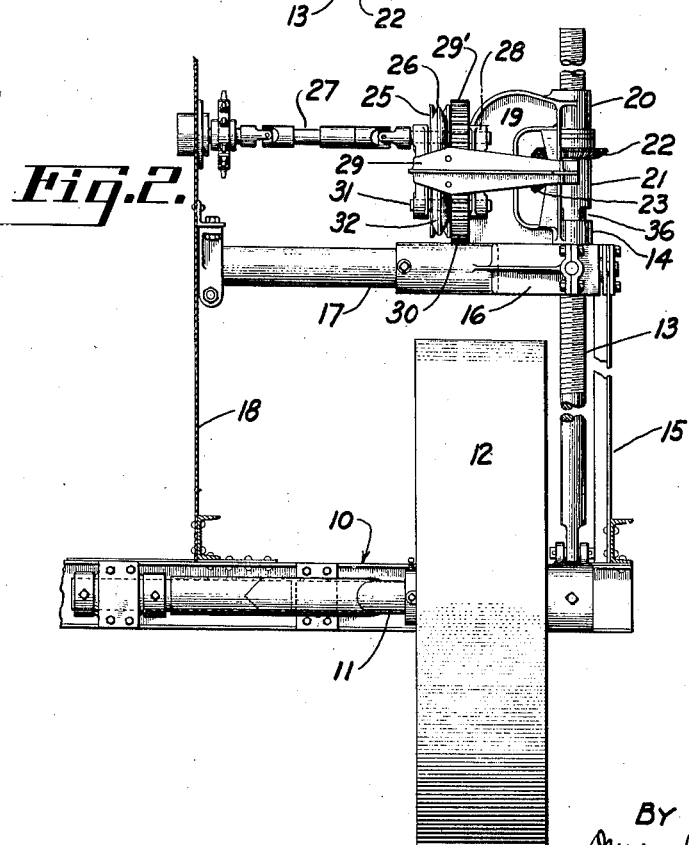
Fig. 2 shows an end elevation of the same.

On the stubble side of the harvester there is formed a wheel frame 10 which carries a crank axle 11 on which is journaled a wheel 12. Connected to the free end of the crank axle is a screw-threaded shaft 13, which near its upper end is supported in a bearing 14 carried by an A-frame 15. This bearing is part of a casting 16 which has a swivel connection with a supporting arm 17 fixed to the adjacent side of a separator body 18. Forming also a part of the casting 16 is an upstanding arm portion 19 which carries a top bearing 20 for the screw shaft. Between the bearings 14 and 20 the shaft is fitted with a screw-threaded driving sleeve 21 carrying a bevel pinion 22 meshing with a driving pinion 23. This driving pinion 23 is fixed on a shaft 24 which is journaled on the arm portion 19 of the casting. At the opposite end of this shaft 24 is a grooved friction wheel 25.

For driving this friction wheel 25 I employ a friction driving disk 26 fixed upon a jointed drive shaft 27 extending outwardly from the side of the separator body. This shaft is journaled at its outer end in supports 28 fixed to a yoke 29, said yoke being pivotally mounted upon the upstanding portion 19 of the casting 16. On the same shaft with the friction disk 26 and connected therewith is a spur gear 29'. This spur gear 29' meshes with another similar gear 30 arranged below it and fixed on a short shaft 31 journaled in extensions of the supports 28. This shaft 31 carries a friction disk 32, similar to the disk 26 and in line therewith. The two disks are so positioned that they cannot be brought into contact with the friction wheel 25 at the same time. A slight rocking of the yoke 29 is necessary to bring either disk into engagement with the wheel 25. Rocking of the yoke 29 is accomplished through a lever 33 which has connections extending to within easy reach of an operator.

A leaf spring 34 co-operating with a detent 35 is provided for retaining the yoke 29 in neutral position when pressure on the level 33 is released.

Due to the spur gear connections between the disks 26 and 32, one will drive the friction wheel 25 in one direction as, for instance, to raise the screw-threaded shaft and the other will drive said friction wheel in the opposite direction so as to lower said shaft. In so raising or lowering the screw shaft the crank axle 11 will be swung about to raise or lower the carrying wheel 12. The arcuate movement of the crank axle will tend to tilt the screw-threaded shaft, but, inasmuch as the upper bearings for this shaft are free to swivel about the supporting arm 17, no binding or strains will occur upon the shafts or gears. The friction drive eliminates any danger of breakage of the mechanism in case an obstruction should become lodged therein.

To keep the screw shaft clean of dirt, dust and chaff I cut a slot 36 in the lower end of the threaded sleeve 21. This slot affords exposed scraping edges around the threads of the shaft at the point where the threads first enter the screw-threaded sleeve and the action will be to clean these threads of any dust or dirt, thereby increasing the life of the screw-threaded shaft.

Various changes in the construction and arrangement of the several parts herein shown and described may be employed without departing from the spirit of my invention as disclosed in the appended claims.

Having thus described my invention what I claim and desire to secure by Letters Patent is:

1. In a combined harvester having a carrying wheel journaled upon a crank axle, mechanism for swinging said axle to raise and lower the wheel for the purpose of leveling the harvester on a side hill, said raising and lowering mechanism including a screw shaft connected with the crank axle, a driving sleeve for said screw shaft and power-operated means for actuating said driving sleeve.

2. In a combined harvester having a carrying wheel journaled upon a crank axle, mechanism for swinging said axle to raise and lower the wheel for the purpose of leveling the harvester on a side hill, said raising and lowering mechanism including a screw shaft connected with the crank axle, a driving sleeve for said screw shaft, power-operated means for actuating said driving sleeve and bearings for the upper end of said screw shaft having a swivel connection with the harvester frame to allow said shaft to tilt to accommodate the arcuate movement of the crank axle.

3. In a combined harvester having a carrying wheel journaled upon a crank axle, mechanism for swinging said axle to raise and lower the wheel for the purpose of leveling the harvester on a side hill, said raising and lowering mechanism including a screw shaft connected with the crank axle, a driving sleeve for said screw shaft, and a friction drive connection for actuating said sleeve.

4. In a combined harvester having a carrying wheel journaled upon a crank axle, mechanism for swinging said axle to raise and lower the wheel for the purpose of leveling the harvester on a side hill, said raising and lowering mechanism including a screw shaft connected with the crank axle, a driving sleeve for said screw shaft, said sleeve having a slot in the lower end thereof to assist in cleaning the threads of the shaft, and power-operated means for actuating said driving sleeve.

5. In a combined harvester having a carrying wheel journaled upon a crank axle, mechanism for swinging said axle to raise and lower the wheel for the purpose of leveling the harvester on a side hill and power-operated driving means therefor including a friction wheel, a pair of friction disks spaced one above the other for contact with said friction wheel, a spur gear carried co-axially with each of said friction disks, said spur gears meshing with each other, and a tilting frame for said friction disks and spur gears whereby to bring said friction disks alternately into contact with the friction wheel.

6. In a combined harvester having a carrying wheel journaled upon a crank axle, mechanism for swinging said axle to raise and lower the wheel for the purpose of leveling the harvester on a side hill and power-operated driving means therefor including a friction wheel, a pair of friction disks spaced one above the other for contact with said friction wheel, a spur gear carried co-axially of each of said friction disks, said spur gears meshing with each other, a tilting frame for said friction disks and spur gears whereby to bring said friction disks alternately into contact with the friction wheel, control means for actuating the tilting frame and yielding means for normally maintaining the tilting frame in position where both of said friction disks will be out of contact with the friction wheel.

7. In a combined harvester having a carrying wheel journaled upon a crank axle, mechanism for swinging said axle to raise and lower the wheel for the purpose of leveling the harvester on a side hill, said raising and lowering mechanism including a screw shaft connected to the crank axle, bearings for the upper end of the screw shaft having a swivel connection with the harvester frame, a threaded sleeve arranged between said bearings for raising and lowering said screw-threaded shaft and driving connections for said threaded sleeve including a friction wheel, a pair of friction disks co-operating therewith for alternate engagement with the friction wheel, means for driving said friction disks in opposite directions and control means for placing either of said friction disks in driving engagement with the friction wheel.

LOWELL H. THOEN.